US008060104B2

(12) United States Patent
Chaudhri et al.

(10) Patent No.: US 8,060,104 B2
(45) Date of Patent: Nov. 15, 2011

(54) COEXISTENCE AND INCUMBENT PROTECTION IN A COGNITIVE RADIO NETWORK

(75) Inventors: Apoorv Chaudhri, Sunrise, FL (US); David P. Gurney, Carpentersville, IL (US); Yadunandana N. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 723 days.

(21) Appl. No.: 12/131,031

(22) Filed: May 30, 2008

(65) Prior Publication Data

US 2009/0298522 A1     Dec. 3, 2009

(51) Int. Cl.
*H04Q 7/20* (2006.01)
(52) U.S. Cl. ............... 455/452.1; 455/450; 455/509; 455/451
(58) Field of Classification Search .............. 455/509, 455/69, 522, 447, 446, 422.1, 513, 62, 67.3, 455/67.11, 63.1, 77, 452.2, 415, 512, 452.1, 455/450, 451; 370/312, 320, 321, 329, 351, 370/338, 231; 375/316, 340
See application file for complete search history.

(56) References Cited

U.S. PATENT DOCUMENTS

| | | | |
|---|---|---|---|
| 6,546,254 B2 | 4/2003 | Fitzgerald | |
| 2002/0002052 A1* | 1/2002 | McHenry | 455/447 |
| 2008/0096542 A1* | 4/2008 | Chu et al. | 455/422.1 |
| 2008/0159208 A1* | 7/2008 | Kloker et al. | 370/329 |
| 2008/0165686 A1* | 7/2008 | Lake et al. | 370/231 |
| 2008/0198948 A1* | 8/2008 | Tang | 375/316 |
| 2008/0219201 A1* | 9/2008 | Challapali et al. | 370/312 |
| 2009/0034508 A1* | 2/2009 | Gurney et al. | 370/351 |
| 2009/0180453 A1* | 7/2009 | Hu | 370/338 |
| 2009/0197627 A1* | 8/2009 | Kuffner et al. | 455/522 |
| 2010/0119016 A1* | 5/2010 | Ghosh | 375/340 |

OTHER PUBLICATIONS

PCT/US2009/045369—International Search Report with Written Opinion, mailed Dec. 3, 2009—21 pages.
EEE 802.22 Working Group of the LAN/MAN Standards Committee, Draft Standard for Wireless Regional Area Networks Part 22, IEEE, Piscataway, NJ, USA[Online] https://mentor.ieee.org/802.22/documents>, Apr. 2008, 426 pages.
Celebi H. et al., Utilization of Location Information in Cognitive Wireless Networks, IEEE Wireless Comunications, IEEE Service Center, Piscataway, NJ, USA, vol. 14, No. 4, Aug. 1, 2007, p. 6-13.
Youping Zhao, Jeffrey H. Reed, Shiwen Mao and Kyung K. Bae—"Overhead Analysis for Radio Environment Map-enabled Cognitive Radio Networks"—IEEE 2006—pp. 18-25.

(Continued)

*Primary Examiner* — Tan Trinh
(74) *Attorney, Agent, or Firm* — Barbara R. Doutre (57) ABSTRACT

A method (300, 400) and a communication system (104, 106, 200) for dynamic RF spectrum allocation among a plurality of RF transmitters (108, 110, 112). A message can be received from a first communication system. The message can include a request (130) for available RF spectrum over which to transmit RF signals. The message can indicate a geographic location of a first non-incumbent transmitter (112) associated with the first communication system. Further, for the RF spectrum, a maximum power level can be determined at which the first non-incumbent transmitter may transmit without exceeding a threshold level of interference at least one focal point (134). A RF spectrum list (138) identifying at least the RF spectrum and the determined maximum power level can be communicated to the first communication system.

18 Claims, 4 Drawing Sheets

OTHER PUBLICATIONS

Youping Zhao, Lizdabel Morales, Joseph Gaeddert, Kyung K. Bae, Jung-Sun Um and Jeffrey H. Reed—"Applying Radio Environment Maps to Cognitive Wireless Regional Area Networks"—IEEE 2007—pp. 115-118.

* cited by examiner

COEXISTENCE AND INCUMBENT PROTECTION IN A COGNITIVE RADIO NETWORK

BACKGROUND OF THE INVENTION

1. Field of the Invention

The present invention generally relates to wireless communication networks and, more particularly, to cognitive radio networks.

2. Background of the Invention

Over the past few decades, the primary format in which multimedia content is stored and distributed has been shifting away from an analog format toward a digital format. One of the many advantages of digitally coding multimedia content is that compression methods can be applied to reduce the amount of storage space and bandwidth required for multimedia data storage and transmission. Thus, multimedia content can be digitally broadcast with higher quality (e.g. high definition) and using less bandwidth as compared to traditional analog broadcasts.

With these benefits in mind, the U.S. Congress has mandated that high power television broadcasters shift their broadcast signals from analog to digital by February 2009, which will free up RF spectrum between the digital channels, also known as white spaces, for other uses. An exception has been reserved, however, for certain licensed incumbent users, such as low power television stations and translators, which primarily serve local regions. User's who wish to transmit in any of the white space spectrums must therefore insure that their transmissions do not interfere with the transmissions of licensed users.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to dynamically allocating RF spectrums among one or more RF transmitters. More particularly, one or more communication systems can communicate with a cognitive radio controller to identify one or more RF spectrums (e.g. a channels) over which to transmit RF signals, as well as threshold power levels, for instance maximum power levels, at which the RF signals may be transmitted. In addition to the threshold power levels, other transmission characteristics also may be identified. The communication systems then may transmit RF signals over selected RF spectrums while insuring that such transmissions do not interfere with the signals generated by other transmitters. In one aspect of the inventive arrangements, the RF spectrums can be those spectrums situated between incumbent channels, otherwise known as white spaces.

Figure 1:
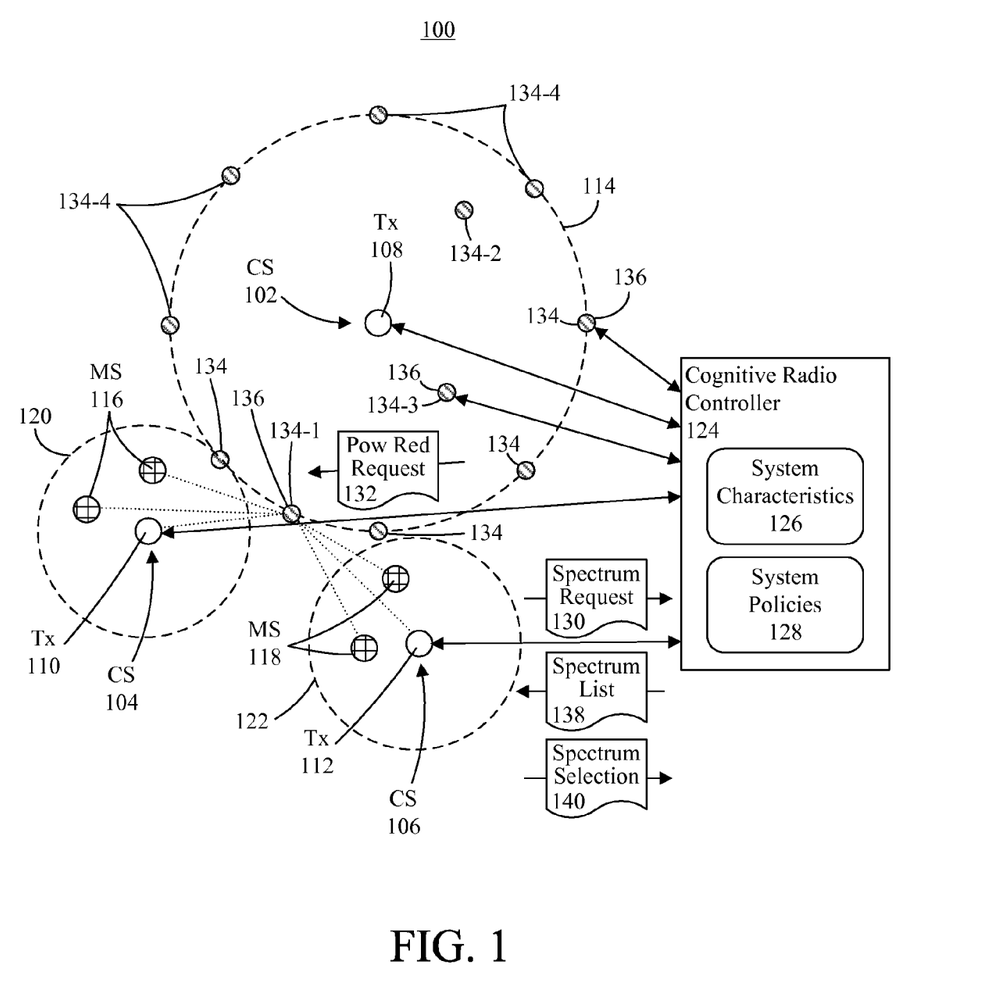
FIG. 1 depicts a system that is useful for understanding the present invention.

FIG. 1 depicts a system 100 that is useful for understanding the present invention. The system 100 can include a plurality of communication systems 102, 104, 106, each of which can comprise a respective transmitter 108, 110, 112. The transmitters 108-112 can be, for example, components of base transceiver stations, repeaters, WLAN access points, or any other systems comprising equipment for wirelessly transmitting RF signals. As such, each of the transmitters 108-112 can comprise one or more antenna elements and one or more components for transmitting RF signals. As known to those skilled in the art, the transmitters 108-112 also may be communicatively linked, or otherwise associated, with any of a myriad of other suitable components, for instance network adapters, communication ports, controllers, and so on, but the invention is not limited in this regard.

In one arrangement, the transmitter 108 can be configured to broadcast television programming, radio signals, public communication signals, emergency response signals, or the like. In another arrangement, the transmitter 108 may be a transceiver configured to communicate data via IEEE 802 wireless communications, for example, 802.11 and 802.16 (WiMAX), 3G, 4G, EUTRAN, UMB, WPA, WPA2, GSM, TDMA, CDMA, WCDMA, OFDM, direct wireless communication, and/or any other communications format. Still, the invention is not limited in this regard and the transmitters 108-112 can be configured to transmit RF signals in accordance with any suitable communications standards, protocols, and/or architectures, or a suitable combination of such standards, protocols, and/or architectures.

In one aspect of the inventive arrangements, the transmitter 108 of the communication system 102 can be an incumbent transmitter. As used herein, the term "incumbent transmitter" means a transmitter that is operated by an entity, also known as a primary user or an incumbent user, who has priority (e.g. a license) to transmit RF signals in one or more frequency bands. For example, the entity may be licensed or otherwise assigned to operate in such frequency bands. Examples of primary users include, but are not limited to, television stations and FCC Part 74 wireless microphone operators.

Further, the priority assigned to the primary user may be applicable to a particular protected region. For example, the entity that operates the transmitter 108 may be assigned as a primary user in a protected region 114. As used herein, a "protected region" is a protected service area for an incumbent transmitter.

In contrast to the incumbent transmitter 108, the transmitters 110, 112 can be non-incumbent transmitters. As used herein, a "non-incumbent transmitter" is a transmitter that is operated by an entity, also known as a secondary or unlicensed user, whose priority to transmit in the frequency band(s) in which the incumbent transmitter 108 operates is generally lower than the priority assigned to the primary user. Nonetheless, the secondary user still may communicate in the frequency band(s) if certain requirements are followed. For instance, one such requirement can be that the transmitters 108, 110 do not generate RF signals that will create an unacceptable level of RF interference within the protected region 114.

An unacceptable level of RF interference may result from any RF signals generated by the non-incumbent transmitter 110 and/or the non-incumbent transmitter 112 that are detectable above a threshold level within the protected region 114. The threshold level can be an allowed or desired maximum transmit power, which may be defined as a maximum peak transmit power, a maximum average transmit power, a peak-to-average power ratio, or the like. The threshold level may be different for different frequency bands, different classes of incumbent services (e.g. analog or digital services, full-power or low-power transmissions, etc.), and/or for different areas of the protected region 114. In one arrangement, the threshold level assigned to an industrial area may be higher than a threshold level assigned to a residential area. By way of example, the threshold levels can correspond to regulations promulgated by various regulatory agencies. Within the United States, for instance, the threshold levels can correspond to threshold interference levels established by the Federal Communications Commission.

One or more of the transmitters 108-112 can be configured to communicate with one or more mobile or fixed stations 116, 118 (hereinafter, both mobile stations and fixed stations are collectively referred to as "mobile stations"). Examples of mobile stations 116, 118 can include, but are not limited to, computers, mobile computers, mobile terminals, mobile telephones, mobile radios, portable radios (e.g. handheld radios), personal digital assistants, application specific devices, or the like. For instance, the transmitter 110 can communicate with a mobile station 116 located in a geographic region 120, or cell, serviced by the transmitter 110. Similarly, the transmitter 112 can communicate with a mobile station 118 located in a geographic region 122, or cell, serviced by the transmitter 112. It should be noted, nonetheless, that any number of transmitters and any number of mobile stations may be provided and the invention is not limited in this regard.

One or more of the communication systems 102-106 can be cognitive radios. For instance, the communication system 104 can be a cognitive radio and the communication system 106 can be a cognitive radio. As used herein, a cognitive radio is a radio that is capable of detecting (e.g. measuring, receiving, determining or otherwise identifying) at least one policy and/or characteristic of the system 100 and, based at least in part on the detected policy and/or characteristic, automatically adjusting its RF transmission characteristics. For example, based on one or more RF environment factors, the communication system 106 can update operation of the transmitter 112 to adjust the transmitter's RF transmission power and other transmission characteristics. As used herein, other transmission characteristics can include, but are not limited to, peak-to-average power ratios, occupied bandwidths, center frequencies, transmit spectral masks, duty cycles, time(s) of operation, signal timing, transmission time slots used (e.g. in a TDMA modulation scheme), and the like.

Similarly, one or more of the mobile stations 116, 118 also can comprise cognitive radios that may adjust their RF transmission characteristics, such as those previously described. The RF transmission characteristics can be adjusted based on a mobile station's geo-location, position relative to other transmitters and/or receivers, for instance the transmitters 108-112 and/or the mobile stations 116, 118. Such other transmitters and/or receivers may be incumbent and/or non-incumbent.

Each of the communication systems 102-106 can be configured to communicate with a cognitive radio controller 124. For example, the communication systems 102-106 can be communicatively linked to the cognitive radio controller 124 via one or more communication backbones, radio access networks (RANs), local area networks (LANs), mesh networks, ad-hoc networks, wide area networks (WANs), such as the Internet, the World Wide Web and/or a public switched telephone network (PSTN), or the like. In that regard, the communication systems 102-106 can communicate with the cognitive radio controller 124 via wired and/or wireless communication links.

The cognitive radio controller 124 can include one or more processors and/or controllers, one or more communication ports and/or communication adapters, and one or more data storage mediums. For instance, the cognitive radio controller 124 may comprise one or more computers (e.g. servers, workstations, personal computers, or the like), one or more application specific computing devices, or any other systems that may send, receive, store and process digital information. Such systems are well known to the skilled artisan.

The cognitive radio controller 124 can comprise one or more databases, data tables, data files, or other suitable structures for storing data. Such data can include, but is not limited to, characteristics 126 of the system 100 and system policies 128 applicable to allocation of RF spectrum resources to the various communication systems 102-106. The system characteristics 126 can include geographic location information for one or more of the transmitters 108-112, RF environment factors of the system 100 (as will be described) and other transmission characteristics that may be processed to implement the system policies 128, such as those defined herein.

The system policies 128 can, for example, define the threshold interference levels for various geographic areas/regions (e.g. the protected region 114), maximum levels of RF transmission power, available frequency spectrums (e.g. channels), and the like. The system policies 128 also can indicate acceptable interference levels in the protected region 114. Such acceptable interference levels can be determined by computing acceptable desired-to-undesired (D/U) interference ratios (or other related measures) for the incumbent and non-incumbent signals. These D/U interference ratios and other related measures can be based on geographic information, signal propagation models and/or other pertinent factors.

By way of example, for a digital television service in the United States, an acceptable D/U interference ratio may be specified not to exceed 23 dBm for co-channel interferers, and −26 dBm for adjacent channel interferers. Such D/U interference levels, however, typically only account for a single continuous interferer operating at a 100% duty cycle on a given TV channel. In accordance with the inventive arrangements described herein, the aggregate RF interference effects from multiple non-incumbent users may be considered when determining the maximum levels of RF transmission power which non-incumbent transmitters may generate without interfering with communications of the digital television service (e.g. generating unacceptable levels of RF interference). Such aggregate interference effects may be determined by evaluating each non-incumbent system's operating frequency, transmit power and other transmission characteristics, such as those previously defined herein.

In operation, the cognitive radio controller 124 can receive a message from the communication systems 102-106 requesting available RF spectrum (e.g. one or more channels) over which to transmit RF signals. For example, the cognitive radio controller 124 can receive a spectrum request 130 from the communication system 106. The spectrum request 130 can indicate a specific RF spectrum that is desired, request the cognitive radio controller 124 to select an available RF spectrum, and/or can indicate for the cognitive radio controller 124 to provide to the communication system 106 a list of available RF spectrums.

The spectrum request 130, or a subsequent message, also can indicate a threshold transmit power level that will not be exceeded by the transmitter 112 while utilizing the requested RF spectrum. The indicated threshold transmit power level can be a maximum transmit power specified for the transmitter 112, though this need not be the case. Further, a geographic location of the transmitter 112 and the geographic region 122 serviced by the transmitter 112 also can be indicated. For example, the spectrum request 130 can include the geographic coordinates of the transmitter 112 and the transmitter's operating range. In another arrangement, the spectrum request 130 can include an identifier which corresponds to one or more system characteristics 126 that correspond to the pertinent transmitter information and which may be accessed by the cognitive radio controller 124. Such identifier can be, for example, an identifier of the communication system 106 and/or the transmitter 112.

Other information also can be provided in the spectrum request 130 or in subsequent messages communicated from the communication system 106 to the cognitive radio controller 124. Such information can include, for example, a required communications quality of service (QOS), such as latency and communications bandwidth requirements. Other examples of information that can be included in the spectrum request 130 can include, but are not limited to, a priority level of the communication system 106 and/or of the transmitter 112, an indication of a maximum number of mobile stations 118 that may transmit RF signals over the requested RF spectrum, the threshold transmit power (e.g. maximum transmit power) that will not be exceeded by the mobile stations 118, the average transmit power of the mobile stations 118, and/or other transmission characteristics of the mobile stations 118.

The cognitive radio controller 124 can process the spectrum request 130, as well as any subsequent messages which may be received, to determine a maximum transmit power at which the transmitter 112 may transmit without exceeding threshold levels of interference for any geographic regions in which primary users may be transmitting, for instance the protected region 114. In an arrangement in which the communication system requested a specific RF spectrum, the cognitive radio controller 124 can compute the maximum allowable transmit power for that RF spectrum. If a plurality of RF spectrums are available for use by the transmitter 112, the cognitive radio controller 124 can determine the maximum allowable transmit power for each of such spectrums. In addition, the cognitive radio controller 124 also can determine other allowable transmission characteristics.

To determine the maximum transmit power at which the transmitter 112 may transmit, as well as the other allowable transmission characteristics, the cognitive radio controller 124 can evaluate the location of the transmitter 112, the time(s) of operation, and the transmit power and other transmission characteristics of the mobile stations 118 serviced by the transmitter 112. This evaluation can be based on an average and/or a maximum number of the mobile stations 118. The cognitive radio controller 124 also can process the geographic locations and other transmission characteristics of other non-incumbent transmitters 110, as well as associated mobile stations 116 serviced by such non-incumbent transmitters, if any, to determine aggregate RF interference levels at one or more of the focal points 134 defined for the system 100.

The cognitive radio controller 124 may further evaluate the geographic location of the incumbent transmitter 108, the protected region 114, the time(s) of operation, as well as the transmit power and other transmission characteristics of any communication devices within the protected region 114 that may transmit RF signals to the communication system 102, if any, to determine aggregate RF interference levels. The results of such evaluations can be assessed against the system policies 128 to arrive at a value for the maximum transmit power for a given non-incumbent system.

By way of example, if the non-incumbent transmitters 110, 112 are located an equal (e.g. line-of-sight) distance from a given focal point 134-1, and the non-incumbent transmitters 110, 112 are transmitting with the same power level at 100% duty cycle, then the interference from the non-incumbent transmitters 110, 112 at the focal point 134-1 will generally be doubled, thus requiring each of the non-incumbent transmitters 110, 112 to reduce its transmit power level by 3 dB in order to maintain the same level of RF interference with the incumbent transmitter 108.

Continuing with the example, if the non-incumbent transmitter 110 transmits with a 50% duty cycle occupying a first half of a time frame, and the incumbent transmitter 108 transmits with a 50% duty cycle occupying a second half of the same time frame, then no power reduction on the part of the non-incumbent transmitter 110 will generally be necessary, regardless of when the non-incumbent transmitter 112 transmits, since the non-incumbent transmitter 110 does not transmit RF signals at the same instance that the incumbent transmitter 108 transmits.

The information that is processed to determine maximum allowable transmit power and other allowable transmission characteristics for the non-incumbent transmitters 110, 112 can be accessed by the cognitive radio controller 124 in any suitable manner. For instance, such information can be maintained as system characteristics 126, and can be updated from time to time. Further, each of the communication systems 102-106 can be configured to periodically update their respective information at periodic intervals and/or when changes to such information are detected. As noted, such information can include, but is not limited to, maximum transmit powers and other transmission characteristics of the transmitters 108-112. The information also can include a number of associated mobile stations, as well as the maximum and/or average transmit power and other transmission characteristics of the mobile stations.

In addition, one or more sensing receivers 136 can be provided to monitor the RF environment within the system 100 and communicate corresponding data to the cognitive radio controller 124, for instance as system characteristics. The sensing receivers 136 can detect RF interference levels in the various RF spectrums used by the system 100. Such RF interference can include, but is not limited to, intentionally transmitted RF signals (e.g. generated by the transmitters 110, 112 and mobile stations 116, 118), unintentionally transmitted RF signals (e.g. electromagnetic interference due to operation of other electrical systems), background noise, or the like.

In one arrangement, one or more of the sensing receivers 136 can be positioned at the focal points 134, though this need not be the case. The focal points 134 can be defined as locations at the protected service contour (e.g. boundary) of a protected region 114 for which RF broadcast rights are assigned to the transmitter 108, within the protected region 114, and/or outside of the protected region 114. In one aspect of the inventive arrangements, the cognitive radio controller 124 can generate interference computations for the focal points 134 that contain sensing receivers 136 and evaluate these measurements against actual measured interference levels at the sensing receivers 136. Any deviation from computed values can be processed to reflect actual measured interference conditions in various RF spectrums at the focal points 134.

As noted, the system policies 128 may define different threshold interference levels for various geographic areas/regions within the protected region 114, and focal points 134 may be defined for such regions. For instance, a focal point 134-2 may be defined in an area within the protected region 114 that is zoned for industrial purposes, and a focal point 134-3 can be defined in an area within the protected region 114 that is zoned for residential purposes.

When determining the maximum allowable transmit power at which the transmitter 112 may transmit, the cognitive radio controller 124 can determine an aggregate level of RF interference currently present at each of the focal points 134, for instance due to other non-incumbent transmitters, mobile stations, etc. In one arrangement, specific propagation models, for instance FCC F-curves, can be utilized to account for distances between non incumbent systems and the interference they cause at the focal points 134. The cognitive radio controller 124 then can determine a maximum amount of power which the transmitter 112 may transmit without causing the aggregate level of RF interference at any of the focal points 134 to exceed the acceptable threshold levels of interference corresponding to the respective focal points 134.

For example, for a particular focal point 134-1, the cognitive radio controller 124 can determine the aggregate level of RF interference currently present at the focal point 134-1. If a sensing receiver 136 is located at the focal point 134-1, the sensing receiver 136 can measure background noise, unintentionally transmitted RF signals, and intentionally transmitted RF signals, both from incumbent and non-incumbent transmitters. Such measurements can be performed using typical demodulation techniques. In certain cases, such measurements may not specifically account for the maximum number of mobile stations 116 to potentially be serviced by the transmitter 110. The contribution of such other mobile stations 116 therefore can be estimated using suitable algorithms, for instance based on their estimated transmit powers, past measurements, the system characteristics 126, statistical probabilities, or in any other suitable manner.

If a sensing receiver 136 is not located at the focal point 134-1, the contribution of RF interference caused by the transmitter 110, mobile stations 116, background noise and other sources also can be estimated. This estimation can be performed with a relatively high level of precision by considering the exact location of the focal point 134-1 (e.g. its distance from various RF interference sources), in addition to geographic features and/or structures that affect propagation of RF signals.

In another arrangement, the background noise and/or RF interference level measurements can be performed by a receiver associated with the transmitter 112 (or the transmitter 112 if it is implemented as a transceiver). In yet another arrangement, these measurements can be performed by other system devices, such as one or more of the mobile stations 118. The mobile stations 118 can communicate the background noise and/or RF interference level measurements to the communication system 106 in any suitable manner. For instance, the sensing receiver 136 can communicate the measurements to the cognitive radio controller 124, and the cognitive radio controller can forward the measurements to the communication system 106.

The current level of RF interference from background noise and the RF interference sources can be subtracted from the threshold level of RF interference to derive an interference contribution value. Based on the geographic location of the focal point 134-1, the geographic location of the transmitter 112 and the geographic region 122 serviced by the transmitter 112, the cognitive radio controller 124 can estimate a combined level of transmit power which can be generated by transmitter 112 and its associated mobile stations 118 without exceeding the interference contribution value at the focal point 134-1.

From this combined level of signal power, an estimation of the RF interference due to the mobile stations 118 can be subtracted to derive a signal power level, which can be referred to as a "point specific transmit power." The cognitive radio controller 124 then can repeat this process to generate a point specific transmit power for other focal points 134, and then select the lowest of these point specific transmit powers as the maximum transmit power at which the transmitter 112 may transmit. It should be noted that the cognitive radio controller 124 need not repeat this process for each of the focal points 134 if the cognitive radio controller 124 can determine that certain focal points, for instance focal points 134-2, 134-3, 134-4, are located further from the transmitter 112 than the focal point 134-1 and that existing RF interference levels at those focal points 134-4 are adequately below the corresponding RF interference threshold values.

In another aspect of the inventive arrangements, the determination of the maximum transmit power for the transmitter 112 can be performed by the communication system 106. For instance, in response to the spectrum request 130, the cognitive radio controller 124 can communicate applicable system characteristics 126 to the system 100, possibly including locations of focal points, transmission characteristics of other incumbent and non-incumbent transmitters (e.g. the transmitter 110 and the mobile stations 116), data received from the sensing receivers 136, etc. The communication system 106 then can process such information as previously described for the cognitive radio controller 124. Such localized computations can reduce the amount of data that is transferred from the cognitive radio controller 124.

The cognitive radio controller 124 then can communicate a message comprising a spectrum list 138 identifying the requested RF spectrum and/or RF spectrums (e.g. channels or sub-channels) available for use by the transmitter 112, as well as the corresponding maximum allowable transmit powers and other allowable transmission characteristics. One or more of the RF spectrums can be those spectrums situated between digital television channels, otherwise known as white spaces, though this need not be the case. The message comprising the spectrum list 138, or one or more subsequent messages, also can indicate RF characteristics associated with any such RF spectrums, for instance whether other incumbent and/or non-incumbent transmitters are operating in such frequency bands or at permissible center operating frequencies, as well as transmission power levels and other transmission characteristics of such other transmitters.

In response to receiving the spectrum list 138, the communication system 106 can determine whether the maximum power level for one or more available RF spectrums is sufficient for proper operation of the transmitter 112. If so, the communication system 106 can select at least one of the RF spectrums for use by the transmitter 112. For example, if there are a plurality of RF spectrums indicated as being available in the spectrum list 138, the communication system 106 can identify at least one of the RF spectrums indicated as having a highest maximum power level at which the transmitter 112 may transmit and select that RF spectrum.

In another aspect of the inventive arrangements, the communication system 106 can select a RF spectrum that has a highest available link budget. The link budget may be estimated for each RF spectrum through the use of active or passive sounding. The use of passive sounding can include measuring a background noise plus a RF interference level at each candidate RF spectrum and computing an estimated link budget for each RF spectrum. The link budget can be defined to be equal to the difference between the maximum allowed transmit power level and the sum of the corresponding background noise plus any other RF interference that may be present.

Active sounding also may be implemented by the communication system 106 to select a RF spectrum for use by the transmitter 112. To implement active sounding, the communication system 106 can send a sounding baud, a training sequence, a preamble, or another suitable transmission from the non-incumbent transmitter 112 to at least one other device in the system, for example to a mobile station 118, over each available RF spectrum. A path loss for each RF spectrum then can be determined by measuring a difference between the maximum allowable transmit power level (or other allowable parameter) and the received power level measured at the receiving device. The RF spectrum with the lowest path loss then can be selected for operation by the non-incumbent transmitter 112.

Still, the communication system 106 can select one or more RF spectrums for use by the transmitter 112 in any suitable manner and the invention is not limited in this regard.

If at least one suitable RF spectrum is identified, the communication system 106 can communicate one or more messages to the cognitive radio controller 124 comprising a spectrum selection 140, the geographic location of the transmitter 112, and the threshold transmit power level that will not be exceeded by the transmitter 112 while utilizing the RF spectrum. The message(s) also can indicate parameters for other transmission characteristics of the transmitter 112.

If, however, the maximum power level for each of the available RF spectrums identified in the spectrum list 138 is insufficient for proper operation of the transmitter 112, the communication system 106 can communicate to the cognitive radio controller 124 a request to transmit at an increased power level determined to be sufficient for proper operation of the transmitter 112. In response, the cognitive radio controller can evaluate the priority level of the communication system 106 and/or the transmitter 112 and determine whether there is another communication system/transmitter in operation having an equal or lower priority level.

If there is such a communication system, for example the communication system 104, the cognitive radio controller 124 can communicate to the communication system 104 a message comprising a request 132 to reduce the transmit power level of the transmitter 110. If the communication system 104 is able to reduce the transmit power of the transmitter 110, the communication system 104 can communicate a message to the cognitive radio controller 124 indicating that the transmit power has been reduced. The cognitive radio controller 124 then can communicate an updated spectrum list 138 to the communication system 106, and the process can repeat. If a system having an equal or lower priority level than the communication system 106 is not available, or such a system having equal priority cannot reduce bandwidth, the cognitive radio controller 124 can indicate to the communication system 106 that the request to increase the transmit power cannot be accommodated.

Figure 2:
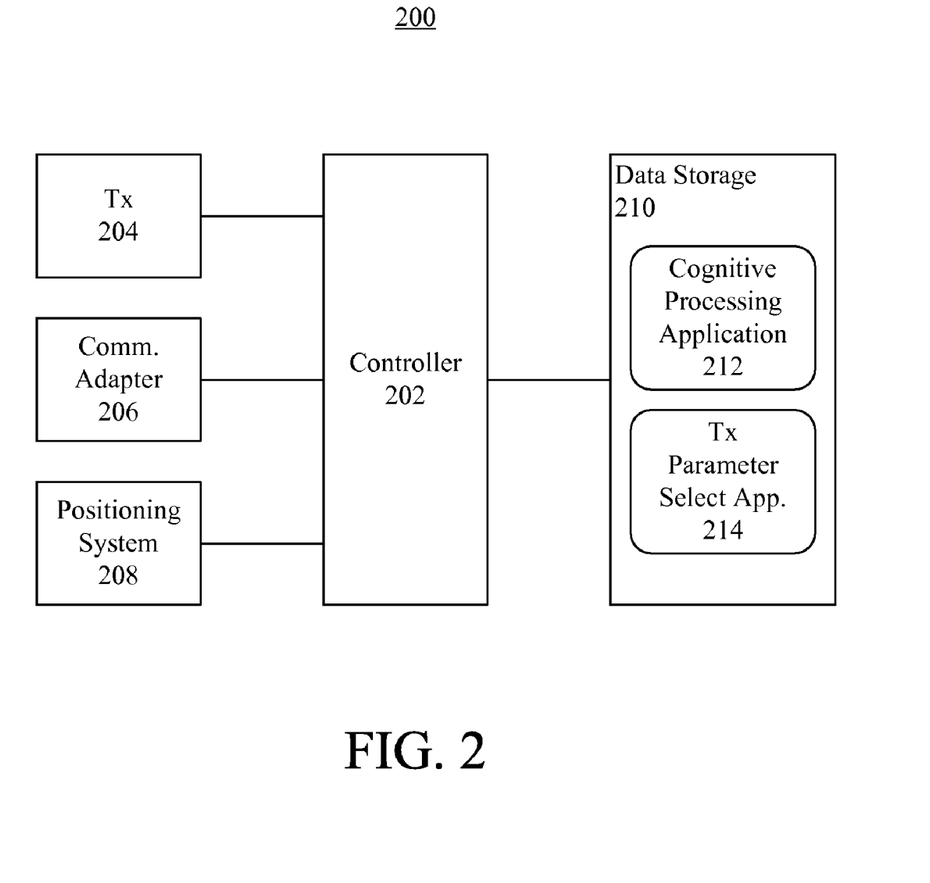
FIG. 2 depicts a block diagram of a communication system that is useful for understanding the present invention.

FIG. 2 depicts a block diagram communication system 200 that is useful for understanding the present invention. The communication system 200 can include a controller 202, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The communication system 200 also can include, or be coupled to, a transmitter 204. In one arrangement, the transmitter 204 can be a transceiver, though this is not a requirement. For instance, the communication system 200 can include a separate receiver. As noted, the transmitter 204 can communicate data via 802.11, 802.16, 802.22, 3G, 4G, EUTRAN, UMB, WPA, WPA2, GSM, TDMA, CDMA, WCDMA, OFDM, direct wireless communication, or any other communications format. In one arrangement, transmitter 204 can be a software defined radio, which is known to the skilled artisan.

Optionally, a communication adapter 206 also can be provided, for example to support communication with the cognitive radio controller as described herein. The communication adapter 206 can be wired and/or wireless. For example, a communication adapter 206 can be a network adapter or a transceiver. In an arrangement in which the transmitter 204 is a transceiver, in lieu of the communication adapter 206, the communication system 200 can communicate with the cognitive radio controller via the transmitter 204, in which case the transmitter 204 would be a communication adapter.

A positioning system 208 also may be optionally provided as a component of the communication system 200. The positioning system 208 can be attached, or located proximate to, the transmitter 204. The positioning system 208 can include a GPS receiver, a local positioning receiver, or any other device that can identify a geographic location of the transmitter 204. Other algorithms may be employed to determine device location, such as estimated time difference of arrival (TDOA), angle of arrival (AOA), or location signature algorithms. These algorithms can be performed by the positioning system 208 or other suitable devices (e.g. by the controller 202 while executing suitable software). Such devices and algorithms are known to the skilled artisan. In lieu of the positioning system, the geographic location of the transmitter can be stored within the communication system 200, for instance within a data storage 210.

The data storage 210 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 210 can be integrated into the controller 202, though this need not be the case.

A cognitive processing application 212 can be stored on the data storage 210 and executed by the controller 202 to perform the methods and processes described herein that are performed by the communication system 200. For example, the cognitive processing application 212 can be executed to generate the spectrum request and communicate the spectrum request to the cognitive radio controller (e.g. via the communication adapter 206 or the transmitter 204). The cognitive processing application 212 also can process the spectrum list received from the cognitive radio controller to identify a suitable RF spectrum, if available, communicate the spectrum selection to the cognitive radio controller, and so on.

A transmit parameter selection application 214 can be executed by the controller 202 to select transmit parameters for the transmitter 204 in accordance with the selected RF spectrum and maximum transmit power with which the transmitter 204 may transmit RF signals. In an arrangement in which the transmitter 204 is a transceiver, receive parameters also can be selected. The controller 202 can communicate the selected transmit and/or receive parameters to the communication system 200 via the transmitter 204 or the communication adapter 206 as required.

Figure 3:
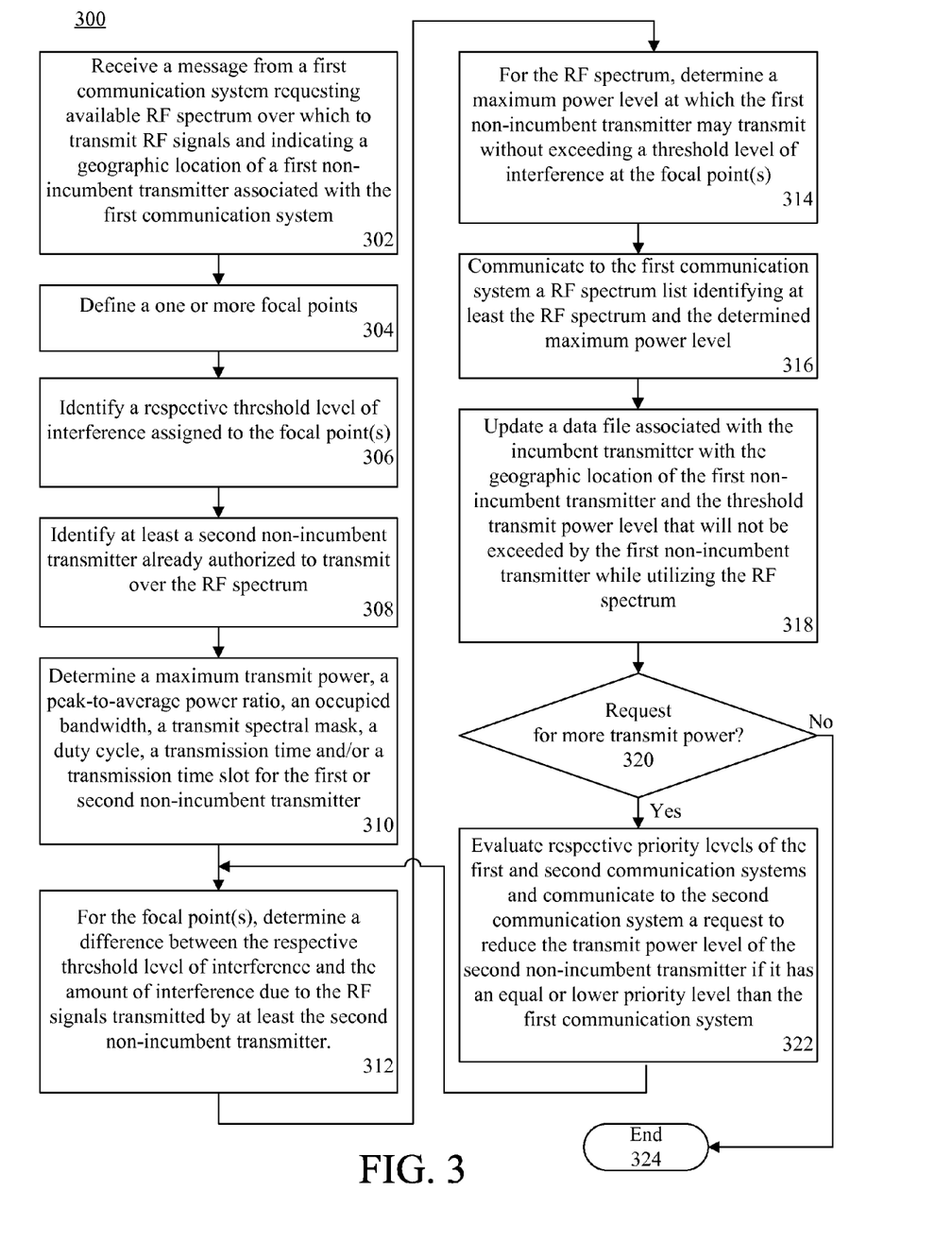
FIG. 3 is a flowchart presenting a method that is useful for understanding the present invention.

FIG. 3 is a flowchart presenting a method 300 of dynamic RF spectrum allocation among one or more RF transmitters. Beginning at step 302, a message can be received from a first communication system requesting available RF spectrum over which to transmit RF signals. The message can indicate a geographic location of a first non-incumbent transmitter associated with the first communication system. The message also can include an indication of a selection by the first communication system to utilize the RF spectrum and an indication of a threshold transmit power level that will not be exceeded by the first non-incumbent transmitter while utilizing the RF spectrum and other transmission characteristics of the non-incumbent transmitter. Additionally, the message also may contain specific non-incumbent transmitter parameters, such as the transmitter's transmit spectral masks, occupied bandwidths, QOS, communication protocols to be used, or the like. The message further can indicate a maximum number of mobile stations which may transmit RF signals over the RF spectrum to the first communication system, a threshold transmit power level that will not be exceeded by the mobile stations while utilizing the RF spectrum, and other transmission characteristics of the mobile stations.

At step 304, one or more focal points can be defined, for example at locations on a protected service contour of a geographic region for which RF broadcast rights are assigned to an incumbent transmitter. In one arrangement, these focal points may be selected to be the points on the protected service contour nearest to the first communication system, and thus capable of experiencing maximum interference. One or more focal points also may be defined within the protected service contour, for instance to identify residential and industrial areas. At step 306, a respective threshold level of interference assigned to the focal point(s) can be identified.

At step 308, at least a second non-incumbent transmitter already authorized to transmit over the RF spectrum can be identified. At step 310, a maximum allowed transmit power, a peak-to-average power ratio, an occupied bandwidth, a transmit spectral mask, a duty cycle, a transmission time and/or a transmission time slot can be determined for the first or second non-incumbent transmitter. Such transmission characteristics may be communicated directly from the non-incumbent transmitter(s) or accessed from stored system characteristic information.

At step 312, for the focal point(s), a determination can be made of a difference between the respective acceptable threshold level of interference and the amount of interference due to the RF signals transmitted by the second non-incumbent transmitter and, optionally, the mobile stations.

At step 314, a maximum power level can be determined for the RF spectrum. The maximum power level can be a level at which the first non-incumbent transmitter may transmit without exceeding an acceptable threshold level of interference at the focal point(s). In one arrangement, a sensing receiver can be located at the focal point(s), and a signal indicating a RF interference level at a focal point(s) can be received. Such signal can be processed when determining the maximum power level for the RF spectrum. Other transmission characteristics also can be processed.

At step 316, a RF spectrum list identifying at least the RF spectrum and the determined maximum power level can be communicated to the first communication system. Further, at step 318 a data file associated with the incumbent transmitter can be updated with the geographic location of the first non-incumbent transmitter and the threshold transmit power level that will not be exceeded by the first non-incumbent transmitter while utilizing the RF spectrum(s).

Referring to decision box 320, if a request for more transmit power is received, at step 322 respective priority levels of the first and second communication systems can be evaluated. In addition, a request to reduce the transmit power level of the second non-incumbent transmitter can be communicated to the second communication system if it has an equal or lower priority level than the first communication system. Optionally, the request can include an indicator of a new maximum transmit power level.

The process then can proceed to step 312 and, for one or more focal points, a determination can be made of a difference between the respective threshold level of interference and the amount of interference due to the RF signals transmitted by the second non-incumbent transmitter (and optionally the mobile stations). If the bandwidth available to the first communication device was not increased, the message can indicate such. Referring again to decision box 320, if a request for more transmit power is not received, the process can end at step 324.

Figure 4:
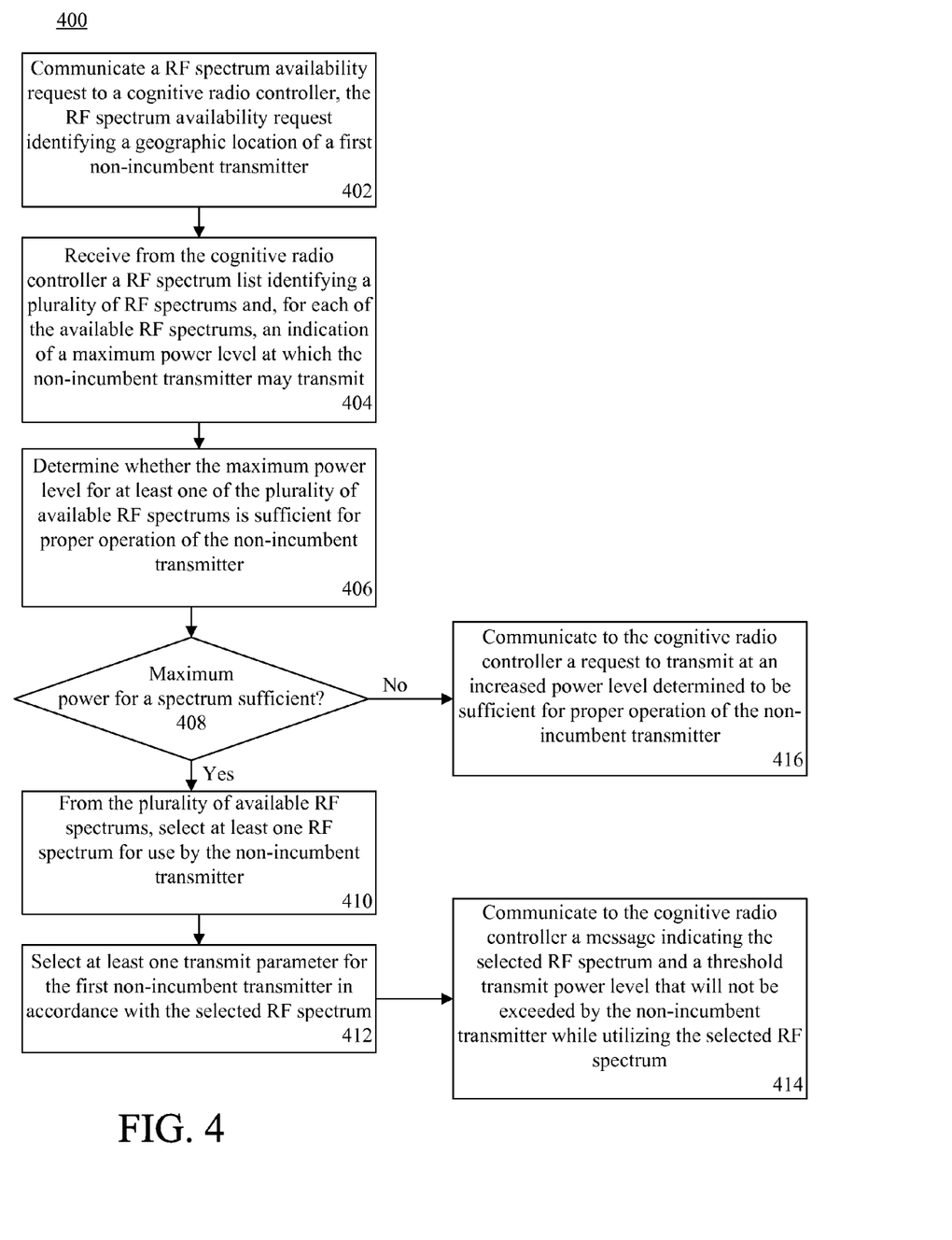
FIG. 4 is a flowchart presenting another method that is useful for understanding the present invention.

FIG. 4 is a flowchart presenting another method 400 of dynamic RF spectrum allocation among a plurality of RF transmitters. Beginning at step 402, a RF spectrum availability request can be communicated to a cognitive radio controller. The RF spectrum availability request can identify a geographic location of a first non-incumbent transmitter. At step 404, a RF spectrum list can be received from the cognitive radio controller. The spectrum list can identify a plurality of RF spectrums and, for each of the available RF spectrums, an indication of a maximum power level at which the non-incumbent transmitter may transmit.

At step 406, a determination can be made whether the maximum power level for at least one of the plurality of available RF spectrums is sufficient for proper operation of the non-incumbent transmitter. Proceeding to decision box 408, if it is determined that the maximum power level for at least one of the plurality of available RF spectrums is sufficient for proper operation of the non-incumbent transmitter, the process can proceed to step 410.

At step 410, from the plurality of available RF spectrums, at least one RF spectrum for use by the non-incumbent transmitter can be selected. For example, an identification can be made of a RF spectrum indicated as having a highest maximum power level at which the non-incumbent transmitter may transmit, and the identified RF spectrum can be selected. Continuing to step 412, at least one transmit parameter can be selected for the first non-incumbent transmitter in accordance with the selected RF spectrum. At step 414, a message can be communicated to the cognitive radio controller to indicate the selected RF spectrum and a threshold transmit power level that will not be exceeded by the non-incumbent transmitter while utilizing the selected RF spectrum.

Referring again to decision box 408, if it is determined that the maximum power level for each of the plurality of available RF spectrums is insufficient for proper operation of the non-incumbent transmitter, at step 416 a request to transmit at an increased power level determined to be sufficient for proper operation of the non-incumbent transmitter can be communicated to the cognitive radio controller.

The methods and systems described herein dynamically allocate one or more RF spectrums among a plurality of RF transmitters. More particularly, one or more communication systems can communicate with a cognitive radio controller to identify a RF spectrum over which to transmit RF signals, as well as a maximum power level at which the RF signals may be transmitted. The communication systems then may transmit RF signals over selected RF spectrums while insuring that such transmissions do not interfere with the signals of other transmitters. Accordingly, efficient use can be made of various RF frequency bands, the availability of which is very valuable as the use of wireless communication devices continues to proliferate around the globe.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of dynamic RF spectrum allocation to at least one RF transmitter, comprising:
   receiving a message from a first communication system requesting available RF spectrum over which to transmit RF signals, the message indicating a geographic location of a first non-incumbent transmitter associated with the first communication system;
   for the RF spectrum, determining a maximum power level at which the first non-incumbent transmitter may transmit without exceeding a threshold level of interference at least one focal point;
   communicating to the first communication system a RF spectrum list identifying at least the RF spectrum and the determined maximum power level; and
   identifying at least a second non-incumbent transmitter already authorized to transmit over the RF spectrum;
   wherein determining the maximum power level at which the first non-incumbent transmitter may transmit without exceeding the threshold level of interference at the at least one focal point comprises:
   determining an amount of interference at the at least one focal point due to RF signals transmitted by at least the second non-incumbent transmitter.

2. The method of claim 1, further comprising:
   defining the at least one focal point to be a location at a protected service contour of a protected region for which RF broadcast rights are assigned to an incumbent transmitter.

3. The method of claim 1, wherein determining the maximum power level at which the first non-incumbent transmitter may transmit without exceeding the threshold level of interference at the at least one focal point comprises:
   determining respective locations of each of the first non-incumbent transmitter and the second non-incumbent transmitter.

4. The method of claim 1, wherein determining the maximum power level at which the first non-incumbent transmitter may transmit without exceeding the threshold level of interference at the at least one focal point comprises:
   for at least one of the first and second non-incumbent transmitters, determining at least one characteristic of transmitted RF signals, the characteristic selected from a group consisting of a peak-to-average power ratio, an occupied bandwidth, a transmit spectral mask, a duty cycle, a transmission time and a transmission time slot; and
   processing the determined characteristic of the transmitted RF signals.

5. The method of claim 1, further comprising:
   for the at least one focal point, identifying a respective threshold level of interference assigned to the focal point;
   wherein determining the maximum power level at which the first non-incumbent transmitter may transmit without exceeding the threshold level of interference at the at least one focal point comprises:
   for the at least one focal point, determining a difference between the respective threshold level of interference and the amount of interference due to the RF signals transmitted by at least the second non-incumbent transmitter.

6. The method of claim 1, further comprising:
receiving from the first communication system a request to transmit at a power level that is greater than the determined maximum power level; and
communicating to a second communication system associated with the second non-incumbent transmitter a request to reduce the transmit power level of the second non-incumbent transmitter.

7. The method of claim 6, wherein receiving from the first communication system the request to transmit at the power level that is greater than the determined maximum power level comprises:
evaluating respective priority levels of the first and second communication systems.

8. A method of dynamic RF spectrum allocation to at least one RF transmitter, comprising:
receiving a message from a first communication system requesting available RF spectrum over which to transmit RF signals, the message indicating a geographic location of a first non-incumbent transmitter associated with the first communication system;
for the RF spectrum, determining a maximum power level at which the first non-incumbent transmitter may transmit without exceeding a threshold level of interference at least one focal point; and
communicating to the first communication system a RF spectrum list identifying at least the RF spectrum and the determined maximum power level, further comprising receiving from the first communication system at least one message, the at least one message comprising:
an indication of a selection by the first communication system to utilize the RF spectrum; and
an indication of a threshold transmit power level that will not be exceeded by the first non-incumbent transmitter while utilizing the RF spectrum.

9. The method of claim 8, wherein:
receiving from the first communication system at least one message further comprises:
receiving an indication of a maximum number of mobile stations which may transmit RF signals over the RF spectrum to the first communication system; and
receiving an indication of a threshold transmit power level that will not be exceeded by the mobile stations while utilizing the RF spectrum; and
determining a maximum power level at which the first non-incumbent transmitter may transmit without exceeding a threshold level of interference at the at least one focal point comprises:
determining an amount of interference at the at least one focal point due to RF signals transmitted by the maximum number of mobile stations.

10. The method of claim 8, further comprising:
updating a data file associated with at least one incumbent transmitter with the geographic location of the first non-incumbent transmitter and the threshold transmit power level that will not be exceeded by the first non-incumbent transmitter while utilizing the RF spectrum.

11. A method of dynamic RF spectrum allocation among a plurality of RF transmitters, comprising:
communicating a RF spectrum availability request to a cognitive radio controller, the RF spectrum availability request identifying a geographic location of a first non-incumbent transmitter;
receiving from the cognitive radio controller a RF spectrum list identifying a plurality of available RF spectrums and, for each of the available RF spectrums, an indication of a maximum power level at which the non-incumbent transmitter may transmit;
determining whether the maximum power level for at least one of the plurality of available RF spectrums is sufficient for proper operation of the non-incumbent transmitter; and
when it is determined that the maximum power level for at least one of the plurality of available RF spectrums is sufficient for proper operation of the non-incumbent transmitter:
from the plurality of available RF spectrums selecting at least one RF spectrum for use by the non-incumbent transmitter; and
communicating to the cognitive radio controller a message indicating the selected RF spectrum and a threshold transmit power level that will not be exceeded by the non-incumbent transmitter while utilizing the selected RF spectrum.

12. The method of claim 11, wherein selecting at least one RF spectrum for use by the non-incumbent transmitter comprises:
identifying a RF spectrum indicated as having a highest maximum power level at which the non-incumbent transmitter may transmit; and
selecting the identified RF spectrum.

13. The method of claim 11, further comprising:
when it is determined that the maximum power level for each of the plurality of available RF spectrums is insufficient for proper operation of the non-incumbent transmitter:
communicating to the cognitive radio controller a request to transmit at an increased power level determined to be sufficient for proper operation of the non-incumbent transmitter.

14. The method of claim 11, further comprising:
selecting at least one transmit parameter for the first non-incumbent transmitter in accordance with the selected RF spectrum.

15. A communication system that dynamically allocates RF spectrum allocation among a plurality of RF transmitters, comprising:
a communication adapter that communicates a RF spectrum availability request to a cognitive radio controller, the RF spectrum availability request identifying a geographic location of a first non-incumbent transmitter, and receives from the cognitive radio controller a RF spectrum list identifying a plurality of RF spectrums and, for each of the available RF spectrums, an indication of a maximum power level at which the non-incumbent transmitter may transmit;
a controller that determines whether the maximum power level for at least one of the plurality of available RF spectrums is sufficient for proper operation of the non-incumbent transmitter and, when it is determined that the maximum power level for at least one of the plurality of available RF spectrums is sufficient for proper operation of the non-incumbent transmitter:
selects from the plurality of available RF spectrums at least one RF spectrum for use by the non-incumbent transmitter and communicates to the cognitive radio controller a message indicating the selected RF spectrum and a threshold transmit power level that will not be exceeded by the non-incumbent transmitter while utilizing the selected RF spectrum.

16. The communication system of claim 15, wherein the controller identifies a RF spectrum indicated as having a highest maximum power level at which the non-incumbent transmitter may transmit and selects the identified RF spectrum.

17. The communication system of claim 15, wherein the communication adapter communicates to the cognitive radio controller a request to transmit at an increased power level determined to be sufficient for proper operation of the non-incumbent transmitter when it is determined that the maximum power level for each of the plurality of available RF spectrums is insufficient for proper operation of the non-incumbent transmitter.

18. The communication system of claim 15, wherein the controller further selects at least one transmit parameter for the first non-incumbent transmitter in accordance with the selected RF spectrum.

* * * * *

UNITED STATES PATENT AND TRADEMARK OFFICE
CERTIFICATE OF CORRECTION

PATENT NO.        : 8,060,104 B2
APPLICATION NO.   : 12/131031
DATED             : November 15, 2011
INVENTOR(S)       : Chaudhri et al.

It is certified that error appears in the above-identified patent and that said Letters Patent is hereby corrected as shown below:

On the Face Page, in Field (57), under "ABSTRACT", in Column 2, Line 11, delete "at" and insert -- at at --, therefor.

In Column 14, Line 20, in Claim 1, delete "at" and insert -- at at --, therefor.

In Column 15, Line 29, in Claim 8, delete "at" and insert -- at at --, therefor.

Signed and Sealed this
Eleventh Day of December, 2012

David J. Kappos
*Director of the United States Patent and Trademark Office*